(12) United States Patent
Simpson

(10) Patent No.: US 10,488,896 B2
(45) Date of Patent: Nov. 26, 2019

(54) DISPLAY HOUSING FOR A DIGITAL DISPLAY SCREEN

(71) Applicant: Coates Technology Labs Pty Limited, Alexandria, New South Wales (AU)

(72) Inventor: Matthew William Simpson, Roselands (AU)

(73) Assignee: Coates Technology Labs Pty Limited, New South Wales (AU)

( * ) Notice: Subject to any disclaimer, the term of this patent is extended or adjusted under 35 U.S.C. 154(b) by 42 days.

(21) Appl. No.: 15/271,447

(22) Filed: Sep. 21, 2016

(65) Prior Publication Data

US 2017/0083059 A1    Mar. 23, 2017

(30) Foreign Application Priority Data

Sep. 22, 2015    (AU) ................. 2015903862

(51) Int. Cl.
  *G06F 1/20*    (2006.01)
  *G06F 1/16*    (2006.01)

(52) U.S. Cl.
  CPC .............. *G06F 1/20* (2013.01); *G06F 1/1601* (2013.01)

(58) Field of Classification Search
  CPC . G06F 1/20; G06F 1/1601; G06F 1/16; G06F 1/203; G06F 1/181; G06F 1/1633; G06F 1/163; G06F 2200/1631; H05K 7/20; H05K 7/20972; H05K 7/20145; H05K 5/0017; H05K 7/20154; H05K 7/20009; H05K 7/20163; H05K 7/20172; H05K 7/202; H05K 7/20209; H05K 7/20554; H05K 7/20909; G02F 1/133385; G02F 1/133308; G02F 1/133603; G02F 2001/133628; G02F 2201/36; F28D 9/00; F28F 3/02
  USPC ..... 361/695, 681, 690, 696, 679.47, 679.21, 361/679.46, 679.48, 688, 692, 694, 679.5, 361/689, 704; 454/184
  See application file for complete search history.

(56) References Cited

U.S. PATENT DOCUMENTS

| | | | | |
|---|---|---|---|---|
| 5,502,457 A | * | 3/1996 | Sakai | .................... G02B 6/06 345/87 |
| 6,104,451 A | * | 8/2000 | Matsuoka | ......... G02F 1/133308 349/58 |
| 8,432,333 B2 | * | 4/2013 | Isoshima | ............ H05K 7/20972 345/55 |
| 8,547,312 B2 | * | 10/2013 | Sato | .................. G02F 1/133385 345/87 |

(Continued)

*Primary Examiner* — Mandeep S Buttar

(57) ABSTRACT

A display housing for a digital display screen, in one embodiment comprising a display screen enclosure adapted to receive a display screen and a computer housing arranged to receive a computer associated with the display screen for providing display content thereto. The computer housing has at least one air intake arranged at a first surface thereof and at least one air outlet arranged at a second surface thereof to define an airflow path between the at least one air intake and the at least one air outlet. The computer housing is adapted to receive the computer at a location in the airflow path and the display screen enclosure is arranged relative to the computer housing such that a fan disposed in a rear portion of a display screen received in the display screen enclosure is located adjacent the at least one air outlet of the computer housing during use.

17 Claims, 10 Drawing Sheets

(56) References Cited

U.S. PATENT DOCUMENTS

| | | | | |
|---|---|---|---|---|
| 2001/0035146 | A1* | 11/2001 | Pietrowski | F02B 27/02 |
| | | | | 123/184.59 |
| 2006/0109656 | A1* | 5/2006 | Takeda | G03B 21/16 |
| | | | | 362/294 |
| 2006/0199505 | A1* | 9/2006 | Fettkether | F24F 13/0218 |
| | | | | 454/232 |
| 2008/0165496 | A1* | 7/2008 | Kang | G02F 1/133308 |
| | | | | 361/692 |
| 2009/0147175 | A1* | 6/2009 | Tsumura | G06F 1/1601 |
| | | | | 349/58 |
| 2011/0037937 | A1* | 2/2011 | Yang | G02F 1/133385 |
| | | | | 349/161 |
| 2011/0085302 | A1* | 4/2011 | Nakamichi | H05K 7/20972 |
| | | | | 361/695 |
| 2012/0012300 | A1* | 1/2012 | Dunn | G02F 1/133385 |
| | | | | 165/287 |
| 2015/0009625 | A1* | 1/2015 | Chin | H05K 7/20145 |
| | | | | 361/695 |

\* cited by examiner

DISPLAY HOUSING FOR A DIGITAL DISPLAY SCREEN

CROSS REFERENCE TO RELATED APPLICATIONS

This application claims priority to Australian patent application number 2015903862 filed Sep. 22, 2015, and claims the benefit thereof, and which is incorporated by reference herein in its entirety.

FIELD

The present invention relates to a display housing for a digital display screen.

BACKGROUND

Digital displays are increasingly used for the purpose of advertising and/or providing information to consumers in a digital format. Known digital displays comprise display screens that are housed in or on a display housing which may be wall mounted or which may be floor or ground mounted depending on the specific circumstances in which the display is required. For example, a wall mounted display may be used in a shop or at a train station platform whereas a floor or ground mounted housing may be used outside a shop or restaurant.

The display content is provided by a computer that is operatively associated with the display screen to provide a continuous display feed to the display screen. The computer is housed within the display housing. The computer must remain cool enough during operation that it does not overheat and fail, as this would lead to a disruption in the continuous operation of the display output. The requirement for cooling is amplified when the digital display housing is used outdoors, particularly in circumstances in which the computer may be subjected to high environmental temperatures.

Known display housings utilise electronic airflow devices such as fans or thermostatically controlled environmental enclosures with air conditioning units for the purpose of keeping the computer at a desired temperature. Whilst such systems can be effective at maintaining the temperature of the computer, they are subject to servicing and potential failure over time, since the components required to cool the computer require regular maintenance. The components add additional cost both at the time of installation and during the lifetime of the display housing.

SUMMARY OF INVENTION

Embodiments of the present invention overcome or ameliorate one or more of the above described disadvantages. There is disclosed herein an embodiment of a display housing for a digital display screen, the display housing comprising a display screen enclosure adapted to receive a display screen and a computer housing arranged to receive a computer associated with the display screen for providing display content thereto, the computer housing having at least one air intake arranged at a first surface thereof and at least one air outlet arranged at a second surface thereof so as to define an airflow path between the at least one air intake and the at least one air outlet, the computer housing being adapted to receive the computer at a location in the airflow path; and wherein the display screen enclosure is arranged relative to the computer housing such that a fan disposed in a rear portion of a display screen received in the display screen enclosure is located adjacent the at least one air outlet of the computer housing during use.

The display housing in the above described embodiment utilises a fan built into the rear of the display screen to cool the computer by drawing warm air in the computer housing that has been heated by the computer through the air outlet and into the fan via the display screen enclosure. This action in turn causes air to be drawn into the computer housing at the air intake such that, whilst the fan is operational, a constant airflow stream passes through the computer housing. The computer is located between the air inlet and the air outlet such that the airflow cools the computer as it is drawn through the computer housing without the need for additional electronic components, air conditioning units or other equipment, thereby saving installation and maintenance costs. This in turn allows the housing to have a small footprint that can be installed into a greater range of areas when compared with known devices that require further fans and/or air conditioning units.

The at least one air outlet in the described embodiment may comprise a ventilation port having an inlet in fluid communication with an interior of the computer housing and an outlet arranged to direct air away from the computer housing and into the display screen enclosure.

The outlet end of the ventilation port may also be arranged to direct air generally horizontally away from the computer housing and into the display screen enclosure.

In an embodiment, the ventilation port comprises an angled conduit having a first generally vertical portion with a lower inlet arranged in fluid communication with an interior of the computer housing and a second generally horizontal portion arranged at an angle to the first generally vertical portion and having an inlet in fluid communication with the first generally vertical portion, and an outlet end that is arranged in fluid communication with the display screen enclosure.

The outlet end of the second generally horizontal portion may be angled at a slight downward angle relative to the inlet thereof.

In this embodiment, airflow can be directed away from the computer in the interior of the computer housing and into the display screen fan via the display screen enclosure. Angling the second portion of the ventilation conduit at a slight downward angle can prevent the ingress of rain into the conduit, thereby protecting the computer and other electrical components such as wiring, power supply and a circuit breaker that are also housed within the computer housing.

In an embodiment, the computer housing includes a computer mounting for receiving a computer thereon. In another embodiment, the computer housing includes a plurality of computer mountings for receiving a plurality of computers thereon.

In an embodiment, the computer housing includes a plurality of air intakes and at least one air outlet for each computer housed within the computer housing.

The at least one air intake may be located in a surface or wall of the computer housing at a height position that is lower than the height position of the computer mounting. The at least one air outlet may be located in a surface or wall of the computer housing at a height position that is higher than the height position of the computer housing. In this arrangement, as the air temperature in the computer housing increases, it rises and flows over a computer mounted in or on the computer mounting and towards the at least one air outlet, to be replaced by cooler air entering the housing from below.

The display screen enclosure may include at least one ventilation aperture for the ventilation of warm air generated by the display screen during use. Also, the display screen enclosure may include a plurality of ventilation apertures configured to distribute warm air away from the display screen and out of the display screen enclosure.

In an embodiment, the display screen enclosure is adapted to receive at least one display screen therein. In another embodiment, the display screen enclosure is adapted for receiving two or more display screens therein. Removable fixtures may be provided in the computer housing for accommodating different sizes and shapes of computers.

Embodiments of the display housing are therefore flexible and can be adapted to accommodate numerous types and numbers of computers and display screens.

Advantageously, a mesh filter may be included at the at least one air outlet for the prevention of dust ingress.

There is also disclosed herein a system for displaying a digital display, the system comprising the display housing for a digital display screen defined above, a digital display screen housed within the display screen enclosure and a computer housed within the computer housing, the computer being operatively associated with the digital display screen and being programmed to provide digital content thereto.

There is further disclosed in an embodiment of the invention, a method of cooling a computer housed in a display housing for a digital display screen, the computer being operatively associated with a digital display screen for providing digital content thereto, the display housing comprising a display screen enclosure adapted to receive a display screen and a computer housing arranged to receive the computer, the computer housing having at least one air intake arranged at a first surface thereof and at least one air outlet arranged at a second surface thereof so as to define an airflow path between the air intake and the air outlet, the computer housing being adapted to receive the computer at a location in the airflow path, the display screen enclosure being arranged relative to the computer housing such that a fan disposed in a rear portion of a display screen received in the display screen enclosure is located adjacent the at least one air outlet of the computer housing during use, the method comprising operating the fan such that it draws air flow through the air intake, over and/or around the computer, through the air outlet and into the display screen enclosure.

BRIEF DESCRIPTION OF DRAWINGS

An embodiment of the present invention will now be described, by way of an example only, with reference to the accompanying drawings wherein:

FIG. 5 is a partial schematic perspective view of the computer housing of FIGS. 3 and 4, showing an airflow path there through;

FIG. 10 is a schematic rear view of the computer housing of FIGS. 8 and 9, showing the airflow path there through.

DESCRIPTION OF EMBODIMENTS

Figure 1:
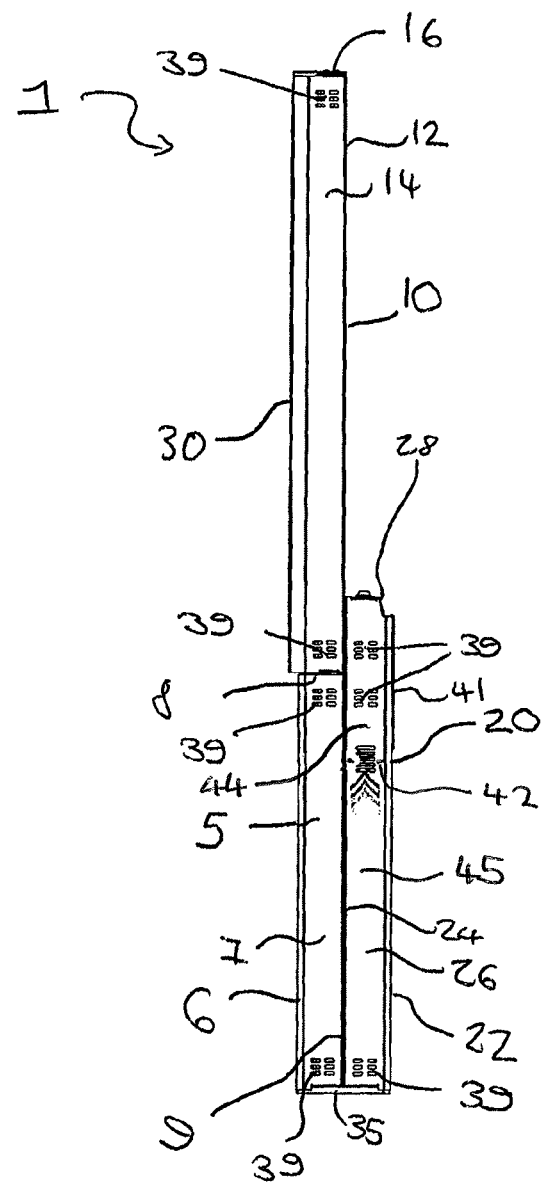
FIG. 1 shows a side view of a display housing according to a first embodiment.

FIGS. 1 to 5 show a first embodiment of a display housing 1 for receiving a display screen 30 therein for the display of digital content to consumers in an outdoor environment, for example, outside a restaurant. The display housing 1 is made of steel and aluminium and comprises an elongate base 5 upon which a display screen enclosure 10 is mounted. The display housing 1 further includes an elongate computer housing 20.

The display screen enclosure 10 is designed to closely fit around the display screen 30 such that the viewing portion of the screen can be seen by a consumer whilst the rest of the screen is protected by the enclosure 10. It comprises an elongate rectangular unit having a rear panel 12 that is approximately the size of the display screen, left and right side panels 14 that are of a depth sufficient to accommodate the depth of the display screen and an upper panel 16 to protect an upper surface of the display screen 30. The display screen 30 is mounted on an upper panel 8 of the base 5. The base 5 generally comprises an elongate rectangular unit, inside of which is housed electrical wires and componentry for the display screen 30. The base 5 includes an elongate panel 6, left and right side panels 7 of the same depth as the side panels 14 of the display screen enclosure 10, a rear panel 9 and the upper panel 8 upon which the display screen 30 is attached.

The computer housing 20 also comprises an elongate rectangular unit of the same depth and width as the base 5 and the display screen enclosure 10. The computer housing 20 is arranged adjacent to the base 5 on a floor panel 35 that accommodates both the computer housing 20 and the base 5. The rear panel 9 of the base 5 lays face to face with the front panel 24 of the computer housing 20. The computer housing 20 is taller than the base 5 such that it can be attached at an upper end thereof to both the base 5 and the display screen enclosure 10 and includes a rear panel 22, side panels 26 and an upper panel 28. The base 5, display screen enclosure 10 and computer housing 20 are each folded and then welded together.

The computer housing 20 is divided into an upper compartment 44 and a lower compartment 45 by a partition wall 42. A computer 40 that is programmed to provide the digital content to the display screen 30 is housed in the upper compartment 44. Removable offset plates (not shown) are provided to accommodate various sizes and shapes of computer 40. The computer 40 is electronically connected to the display screen 30 by wires (not shown). An access panel 41 is arranged in the rear face panel 22 of the computer housing 20 for ease of access to the computer 40 for the purpose of servicing and replacement and is secured to the computer housing 20 by removable fasteners (not shown) such as screws or bolts. Electrical wires and a power supply associated with the computer 40 are housed in the lower compartment 45.

A primary air intake comprises an air intake conduit 46 attached to a side panel 26 of the computer housing for admitting ambient air into an inlet of the upper compartment 44. A secondary air intake conduit 48 is located in the partition 42 for admitting air from the lower part 45 of the computer housing 20 into the upper compartment 44. The upper panel 28 of the computer housing includes a ventilation port 50 located thereon through which warm air generated by the computer 40 can exit the upper compartment 44. The ventilation port 50 is an angled conduit having a generally vertical lower portion 52 that is arranged in fluid communication with the upper compartment 44 of the computer housing 20 and a generally horizontal upper portion 54 that faces rearwardly towards the display screen enclosure 10. The generally horizontal upper portion 54 terminates at an outlet 56 that faces the display screen enclosure. An air flow path 60 through the computer housing 20 is depicted by the arrows in FIGS. 3 and 5 in particular and extends from the primary air intake conduit 46, secondary air intake conduit 48, upwardly through the computer housing 20 to the ventilation port 50.

The display screen 30 includes a pair of fans 32 disposed one above the other in a central part of a rear face thereof for cooling the electronic components of the display screen 30. The outlet 56 of the ventilation port 50 is positioned adjacent a fan 32 of the display screen 30, in fluid communication therewith.

Figure 2:
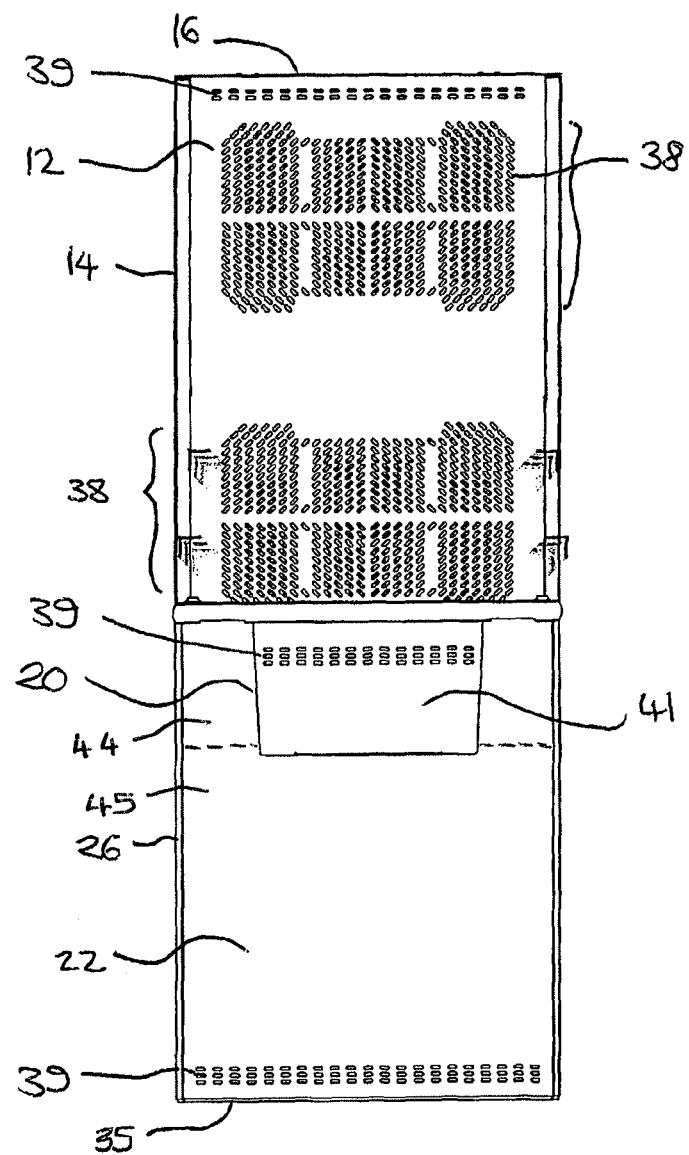
FIG. 2 shows a rear view of the display housing of FIG. 1.

The display screen 30 includes a wire covering over each of the fans 32 along a rear surface of the display screen 30 and ventilation apertures 34 located in a rear surface thereof that are located either side of the fans 32. The rear face 12 of the display screen enclosure includes a plurality of ventilation apertures 38 positioned such that when the display screen 30 is housed in the display screen enclosure 10, warm air generated by the display screen 30 can exit the screen via its ventilation apertures 34 and then through the ventilation apertures 38 to cool the display screen 30. As shown in FIGS. 1 and 2, each of the panels 12, 14, 16 of the display screen enclosure, panels 6, 7 of the base panels, panels 22 and 26 of the computer housing and the access panel 41 includes ventilation apertures 39 through which warm air generated by the computer 40 and/or the display screen 30 may exit the display housing 1.

An exemplary operation of the display housing 1 is as follows. When the display screen 30 is operational, its fans 32 rotate to cool the display screen 30. The rotation of the lower fan 32 draws air through the ventilation port 50 of the computer housing 20, which in turn causes air to be drawn into the upper compartment 44 of the computer housing 20 via the primary air intake 46 and the secondary air intake 48. Since the air flowing into the primary and secondary air intakes 46, 48 flows over and around the computer 40 towards the ventilation port 50, the computer 40 is thereby cooled. The warm air flowing through the fan 32 is then dispelled from the display screen through the ventilation apertures 34 in the screen and 38 in the display screen enclosure 10.

Figure 3:
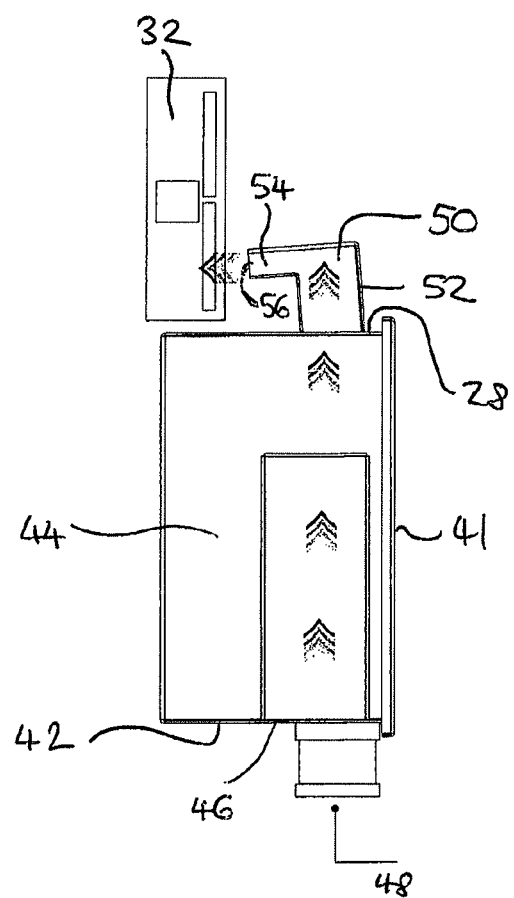
FIG. 3 is a partial schematic side view of the upper compartment of the computer housing of the embodiment of FIG. 1.
Figure 4:
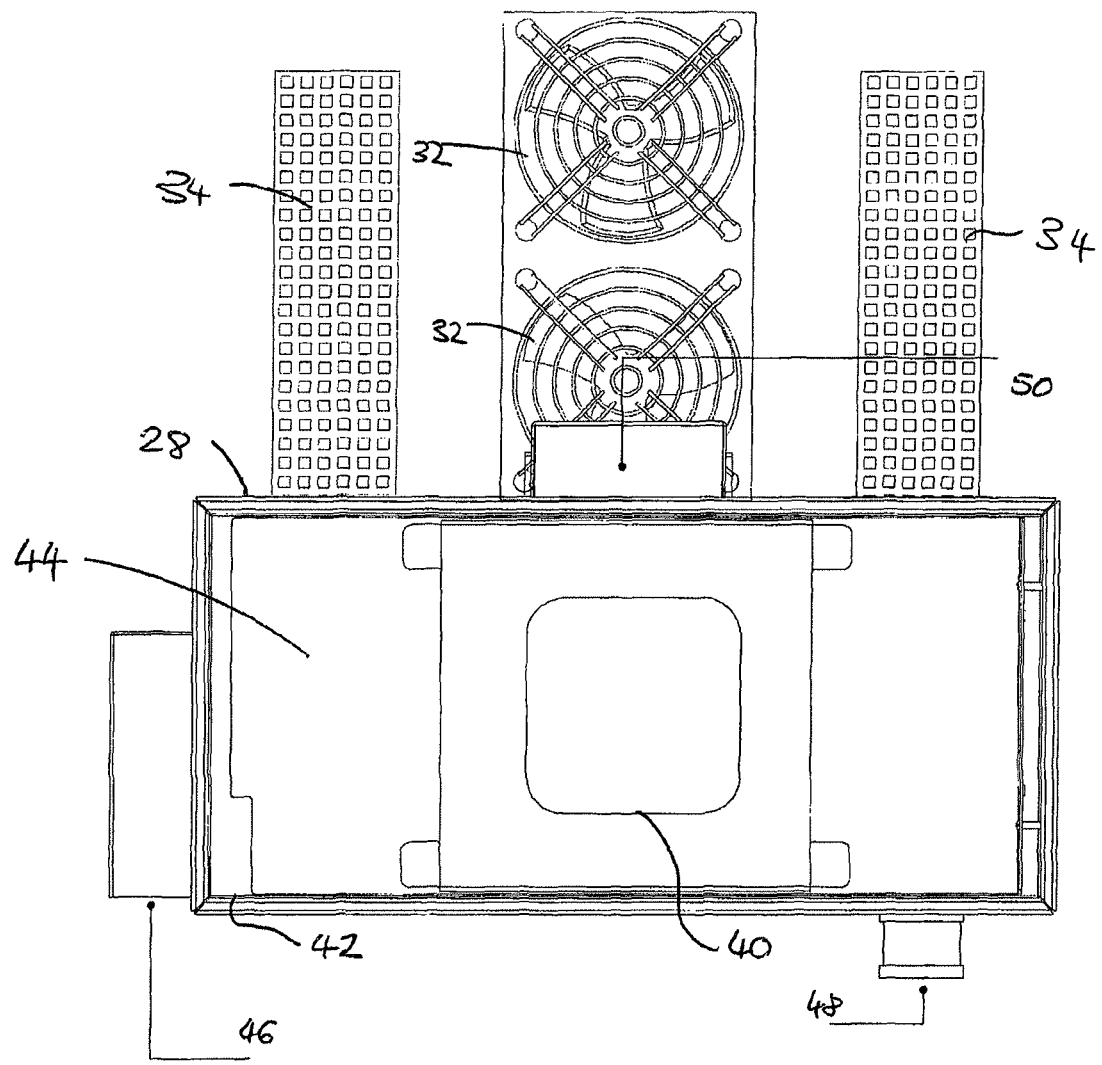
FIG. 4 is a partial schematic rear view of the computer housing of FIG. 3.
Figure 5:
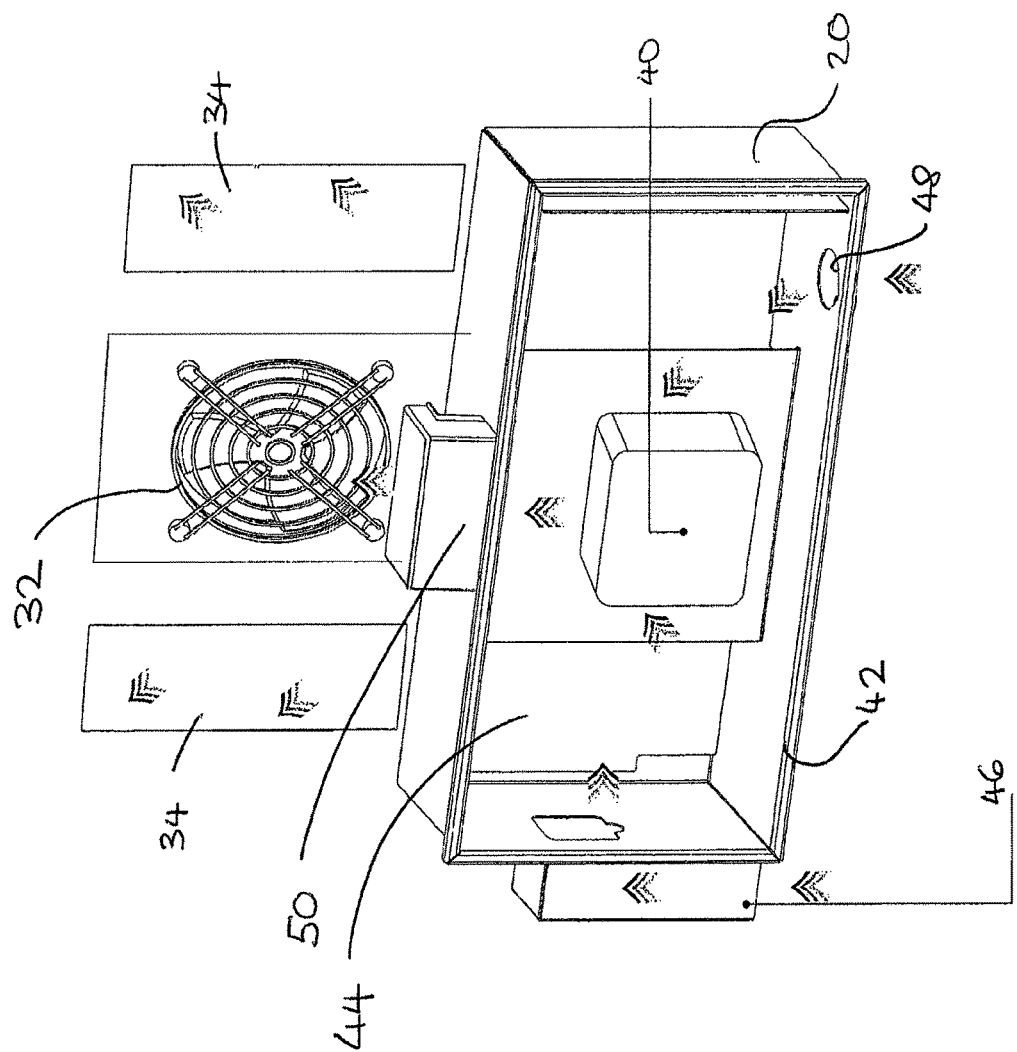
Figure 6:
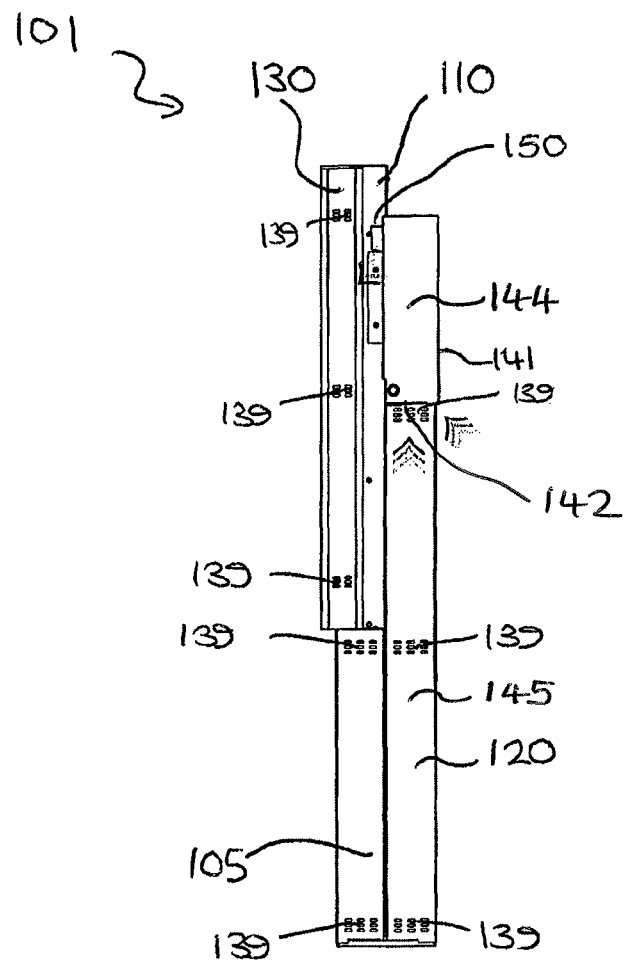
FIG. 6 is a side view of a second embodiment of a display housing.
Figure 7:
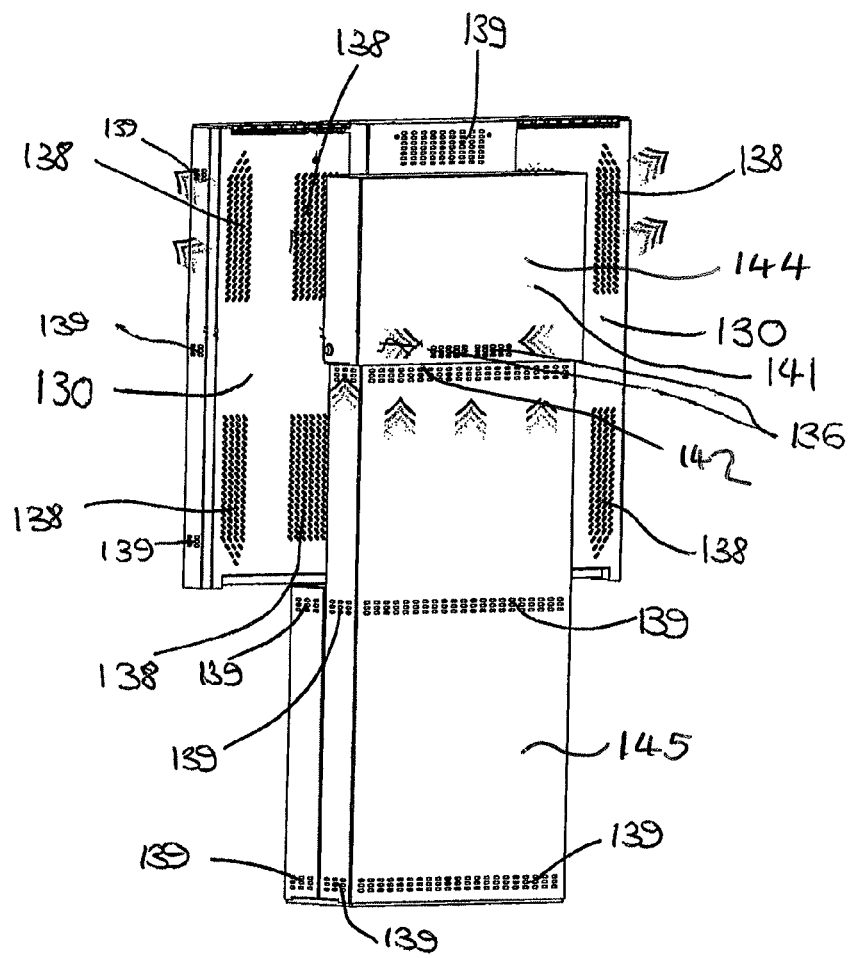
FIG. 7 is a rear view of the display housing of FIG. 6.

The display housing 1 is particularly useful for use in an outdoor environment since as the display screen 30 increases in temperature, the fans 32 increase in rotational speed, which in turn draws airflow through the ventilation port 50 faster and results in an increased airflow through the upper compartment 44 of the computer housing 20. The ventilation port 50 is of an inverted L-shape in order to protect the air outlet 56 from the ingress of rain water. To this end, the generally horizontal portion 54 of the ventilation port 50 is angled at a slight downward angle as shown in FIG. 3 to ensure that no rain water falls through the ventilation port 50 and into the computer housing 20. A mesh filter may be installed at the air outlet 56 or at any of the other ventilation apertures 38, 39 as deemed necessary in the specific environment in which the display housing 1 is to be installed. As will be appreciated by the skilled person, the display housing computer cooling system does not rely on additional componentry that may itself overheat in an outdoor environment and which may also require regular servicing and maintenance in order to function in an outdoor environment.

FIGS. 6 to 10 show a second embodiment of a display housing 101. The display housing 101 has many similarities with that of the display housing 1, however it is adapted for use with two display screens 130 that are mounted adjacent one another on a base 105. The similarities and differences between the display housing 1 and the display housing 101 will be described below.

The computer housing 120 of the display housing 101 is taller than that of the computer housing 20 of the display housing 1 and reaches almost to the top of the display screens 130. As with the computer housing 20, the computer housing 120 is partitioned towards an upper end thereof into an upper compartment 144 and a lower compartment 145 by a partition 142. Inside of the upper compartment 144 are housed a pair of computers 140, each of which is programmed to provide digital content to the display screen 130 behind which it is mounted. An access cover 141 is provided over the upper compartment 144 for ease of access to the computers 140 housed in the upper compartment 144 for servicing and/or replacement thereof. Electrical wires and power supplies associated with the computers 140 are housed in the lower compartment 145.

Figure 10:
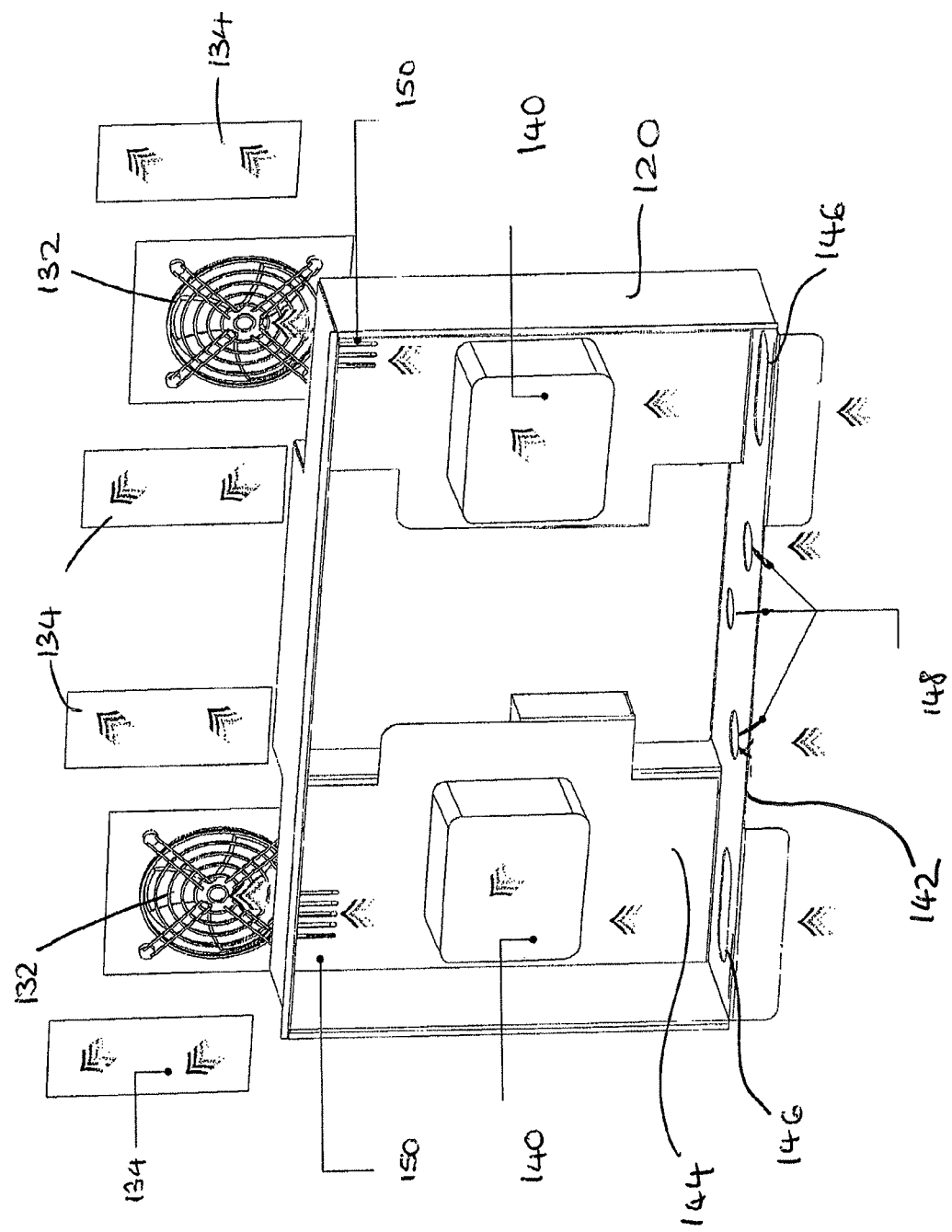

The upper compartment 144 of the computer housing 120 includes a pair of primary air intakes 146 located in the partition 142, each primary air intake 146 being located beneath one of the computers 140 so that ambient air admitted into the compartment 144 can flow over the computer 140 in its path. As shown in FIG. 10, the upper compartment 144 also includes a plurality of secondary air intakes 148 located in the partition 142 for the admission of further air into the upper compartment 144.

The upper compartment 144 further includes a pair of ventilation ports 150 attached to a front panel of the computer housing 120 at an upper end thereof. The ventilation ports 150 are short conduits having an inlet that is in fluid communication with the upper compartment 144 and an outlet that is located adjacent to a fan 132 of the display screen 130 behind which the ventilation conduit is located. The ventilation ports 150 are sheltered from the elements by the access cover 141 whilst providing a direct airflow to the fan 132 from the upper compartment 144.

Figure 8:
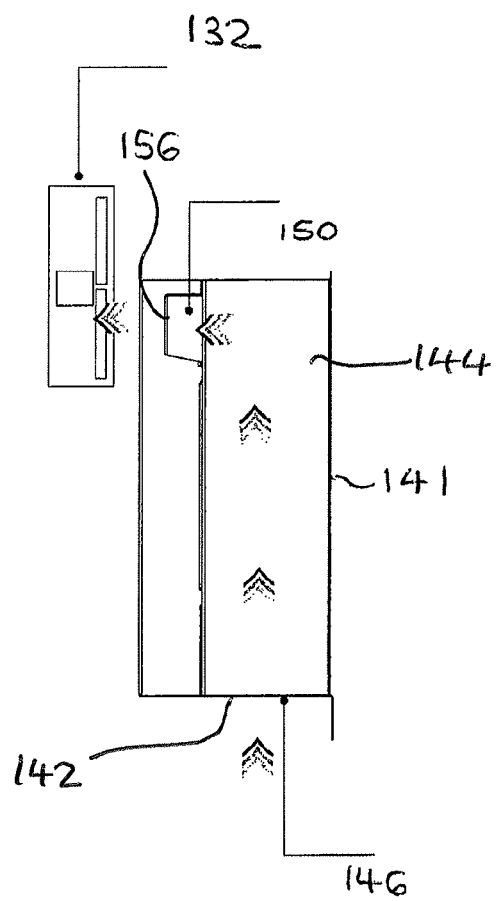
FIG. 8 is a schematic side view of an upper compartment of the computer housing of the display housing of FIGS. 6 and 7.
Figure 9:
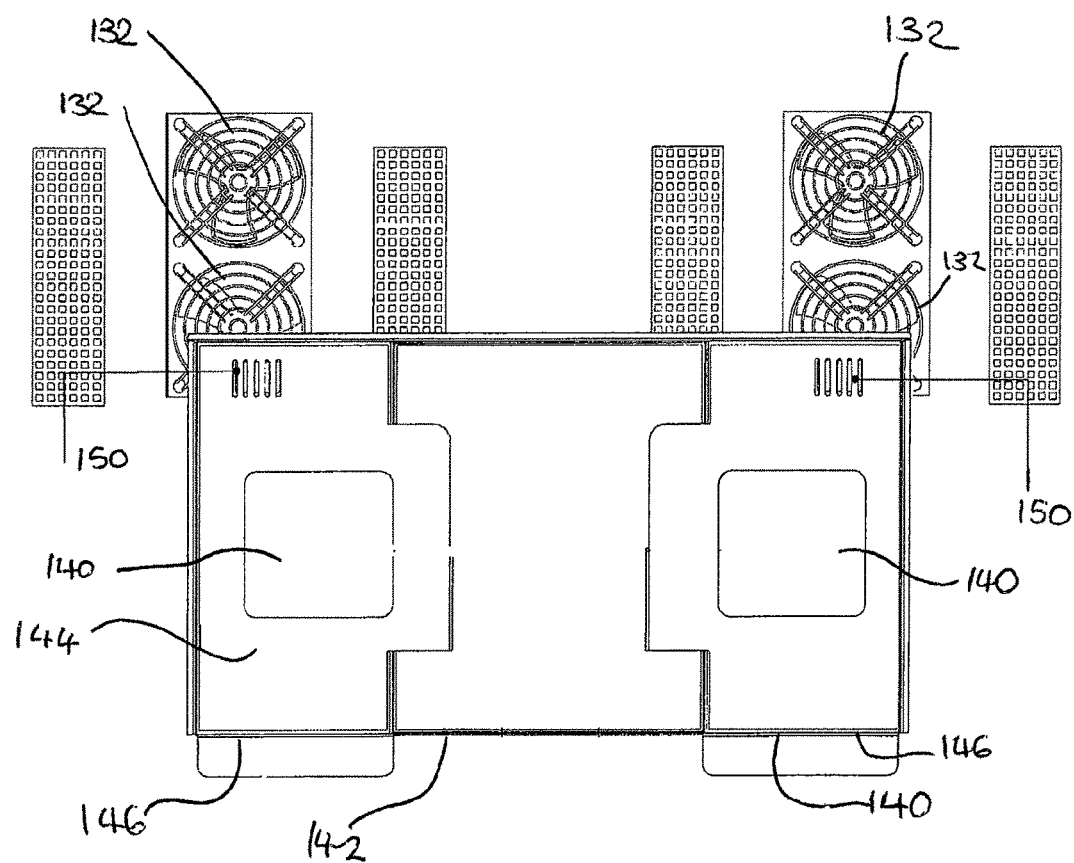
FIG. 9 is a schematic rear view of the computer housing of FIG. 8.

As shown in FIGS. 8 and 10, operation of the second embodiment of the display housing 101 is very similar to that of the display housing 1. When the display screens 130 are operating and in use, the fans 132 of the display screen 130 will rotate in order to keep the display screen cool. The ventilation port 150 arranged adjacent each of the fans 132 provides a pathway for air in the upper compartment 144 to be drawn through the ventilation conduit 150 and into the display enclosure 110 via the fans 132. This in turn causes cooler air to be drawn through the primary air intakes 146 and the secondary air intakes 148. The cooler air passes over each of the computers 140 in its path towards the ventilation ports 150, thereby cooling the computers 140.

As with the display housing 1, the display screen enclosure 110 includes a series of ventilation apertures 138 in a rear surface thereof for the dispersion of warm air away from the display screen 130 and the display screen enclosure 110. In this manner, as the outside air temperature increases, and the fans increase in rotation in order to maintain the temperature of the displays screens 130, a corresponding increased flow of air passes through the upper compartment 144 of the computer housing 120 to cool the computers 140. The panels forming the display screen enclosure 110, the base 105 and the computer housing 120 each include a number of ventilation apertures 139 through which warm air may exit the display housing 101. The access cover 141 includes further ventilation apertures 136 through which relatively cool air may be admitted into the upper compartment 44 for cooling the computers 140.

The display housing further provides cooling of the computer(s) in a variety of ambient temperatures without the use of additional components and targets the hottest points of the computer and housing, drawing air away from these areas.

Although the invention has been described with reference to specific examples, it would be appreciated by those skilled in the art that the invention may be embodied in many other forms.

The invention claimed is:

1. A display housing for a digital display screen providing ventilation to surroundings exterior to the display housing, the display housing comprising a display screen enclosure adapted to receive a display screen and a computer housing arranged to receive a computer associated with the display screen for providing display content thereto, the display screen enclosure consisting of a first series of exterior panels and the computer housing formed of a second series of interior and exterior panels such that the display screen enclosure and the computer housing are separable, not sharing any panels in common, the display screen enclosure including a fan disposed along a rear portion of the display screen, the computer housing having at least one air intake arranged along a first surface thereof to receive air from surroundings exterior to the display housing and at least one air outlet arranged along a second surface thereof so as to define an airflow path extending from the at least one air intake and through the at least one air outlet, the computer housing configured to receive the computer at a location in the airflow path; and wherein the display screen enclosure is arranged relative to the computer housing such that the fan disposed along the rear portion of the display screen is located adjacent the at least one air outlet of the computer housing during use, such that operating the fan draws air flow from surroundings exterior to the display housing and through the at least one air intake, over and/or around the computer, through the air outlet and into the display screen enclosure.

2. The display housing of claim 1, wherein the at least one air outlet comprises a ventilation port having an inlet in fluid communication with an interior of the computer housing and an outlet arranged to direct air away from the computer housing and into the display screen enclosure.

3. The display housing of claim 2, wherein the outlet of the ventilation port is arranged to direct air generally horizontally away from the computer housing and into the display screen enclosure.

4. The display housing of claim 2, wherein the ventilation port comprises an angled conduit having a first generally vertical portion with a lower inlet arranged in fluid communication with the interior of the computer housing and a second generally horizontal portion arranged at an angle to the first generally vertical portion and having an inlet in fluid communication with the first generally vertical portion, and an outlet end that is arranged in fluid communication with the display screen enclosure.

5. The display housing of claim 4, wherein the outlet end of the second generally horizontal portion is angled at a slight downward angle relative to the inlet thereof.

6. The display housing of claim 1, wherein the computer housing includes a computer mounting for receiving a computer thereon.

7. The display housing of claim 1, wherein the computer housing includes a plurality of computer mountings for receiving a plurality of computers thereon.

8. The display housing of claim 1, wherein the computer housing includes a plurality of air intakes arranged to receive air from surroundings exterior to the display housing and at least one air outlet for each computer to be housed within the computer housing.

9. The display housing of claim 6, wherein the at least one air intake is located in a surface or wall of the computer housing at a height position that is lower than a height position of the computer mounting.

10. The display housing of claim 8, wherein the at least one air outlet is located in a surface or wall of the computer housing at a height position that is higher than a height position of the computer housing.

11. The display housing of claim 1, wherein the display screen enclosure includes at least one ventilation aperture for the ventilation of warm air generated by the display screen during use.

12. The display housing of claim 10, wherein the display screen enclosure includes a plurality of ventilation apertures configured to distribute warm air away from the display screen and out of the display screen enclosure.

13. The display housing of claim 1, wherein the display screen enclosure is adapted to receive at least one display screen therein.

14. The display housing of claim 1, wherein the display screen enclosure is adapted for receiving two or more display screens therein.

15. The display housing of claim 1, wherein a mesh filter is included at the at least one air outlet for the prevention of dust ingress.

16. A system for displaying a digital display, the system comprising the display housing for a digital display screen as defined in claim 1, a digital display screen housed within the display screen enclosure and a computer housed within the computer housing, wherein the computer is operatively associated with the digital display screen and programmed to provide digital content thereto.

17. The display housing of claim 1, wherein the computer housing comprises an elongate rectangular unit.

* * * * *